United States Patent [19]

Gullickson

[11] 3,837,256

[45] Sept. 24, 1974

[54] SIGHT AND SOUND MUSICAL INSTRUMENT INSTRUCTION

[76] Inventor: Cecil F. Gullickson, 2018 Fosgate Dr., Winter Park, Fla. 32789

[22] Filed: Sept. 21, 1971

[21] Appl. No.: 182,484

[52] U.S. Cl............... 84/478, 84/470, 84/1.03, 84/DIG. 12
[51] Int. Cl. .............................. G09b 15/08
[58] Field of Search ............ 84/470, 471, 477, 478, 84/DIG. 12, 29, 1.03; 35/6, 9 R, 9 A

[56] References Cited
UNITED STATES PATENTS

| 3,141,243 | 7/1964 | Chapman et al.............. 35/9 A |
| 3,309,454 | 3/1967 | Cutler et al.............. 84/DIG. 12 |
| 3,377,716 | 4/1968 | Schmoyer................. 84/470 X |
| 3,379,087 | 4/1968 | Weitzner..................... 84/478 |
| 3,415,152 | 12/1968 | Gullickson................. 84/478 |
| 3,482,480 | 12/1969 | Decker...................... 84/478 |
| 3,503,297 | 3/1970 | Schmoyer et al............ 84/478 |
| 3,552,256 | 1/1971 | Soanes et al.............. 84/470 X |
| 3,604,299 | 9/1971 | Englund.................... 84/1.03 |

Primary Examiner—Stephen J. Tomsky
Assistant Examiner—John F. Gonzales
Attorney, Agent, or Firm—Julian C. Renfro

[57] ABSTRACT

A sight and sound instructional arrangement for use with certain musical instruments, including keyboard instruments and fretted instruments, involving the use of illumination means associated with certain keys or frets of such instruments, in conjunction with means sensitive to certain coded information and connected to turn on the illumination means upon such information being received by a binary sequential decoding system utilized herein. This arrangement is particularly suitable for use by a beginning musician inasmuch as by the use of this invention, he or she can see certain keys or frets illuminated at such time as the decoder means receives the preascertained information. One preferred embodiment of this invention involves the use of instructional tapes containing voice instruction for the beginning musician as well as coded information for causing keys or frets appropriate to the instruction to be illuminated at the proper time. Other facets of my invention include the tapes containing rhythm information such that the tones provided by the depressing of the keys is interrupted in a pre-ascertained manner, so as to provide desired rhythm patterns. Rhythm information can also be used to key percussion or drum sounds.

16 Claims, 12 Drawing Figures

FIG. 1

INVENTOR
CECIL F. GULLICKSON

BY *Julian C. Renfro*

ATTORNEY

INVENTOR
CECIL F. GULLICKSON

BY Julian C. Renfro

ATTORNEY

PATENTED SEP 24 1974

INVENTOR
CECIL F. GULLICKSON
BY Julian C. Renfro
ATTORNEY

SIGHT AND SOUND MUSICAL INSTRUMENT INSTRUCTION

REFERENCE TO RELATED INVENTION

This invention is related to my patent entitled "Music Teaching Aid," U.S. Pat. No. 3,415,152, which issued Dec. 10, 1968, as well as to my co-pending application entitled "Sight and Sound Teaching Aid for Keyboard Instruments," U.S. Pat. No. 54,733, filed July 14, 1970, now U.S. Pat. No. 3,731,582.

BACKGROUND OF THE INVENTION

1. Field of the Invention

This invention pertains to aids to be used by an amateur musician when learning to play a keyboard or fretted instrument, so that he or she can be instructed as to the precise location of keys or frets that are to be associated with certain frequencies or melodies.

2. Description of the Prior Art

A number of aids for use with keyboard instruments have been proposed in the past, but these have usually been either comparatively ineffective, or else have been large and expensive. Certain tapes have been available that contained specific instruction as to the manner in which the beginning musician placed his hands on the keyboard, and some of these tapes have even contained tones such that the student could ascertain when he had selected the proper note to be played. Other tapes have contained accompaniments such that the student could play along with the tape, with the melody he provided hopefully blending with the accompaniment the tape was supplying.

Other more elaborate means have been proposed which would entail the use of an instructor's keyboard and a student's keyboard utilized in conjunction with a tape playing arrangement. Some advantages are made possible by such an arrangement, such as the instructor being able to interpose additional teaching assistance over and above that being presented by the tape. However, few purchasers can afford the expense involved in an arrangement of this type, and the space necessitated by such a device is so great as to make it impractical for use in the average home.

SUMMARY OF THIS INVENTION

This invention represents a highly satisfactory yet low cost arrangement for indicating to beginning musicians the precise locations of certain keys on the keyboard of a musical instrument, which keys, when struck in response to the illumination thereof, bring about the student playing a simple or eventually a complicated melody. Further, the frets of a stringed instrument can likewise be selectively illuminated so as to provide instruction. The illumination means is activated by a decoder that is arranged to receive coded information from a prerecorded tape, such as a cassette type tape. Thus, in response to the decoder means being subjected to certain information contained on the tape, the illumination means associated with the keys or frets are caused to be illuminated in a manner appropriate to the playing of a selected melody.

Although this invention can be put to a wide range of uses, a preferred arrangement involves utilization in conjunction with an instructional tape that is prerecorded to contain voice instruction as well as accompanying coded information, with latter information causing the sequential illumination of the lighting means associated with certain keys or frets of the instrument. As should quickly become apparent, this amounts to a sight and sound instruction such that a vocal recording can explain to the student the technique that is to be developed, and the keys or frets illuminated at an appropriate time so as to unerringly indicate the location of the keys or frets upon which the student should place his or her fingers in order to bring about the playing of the chosen piece of music.

Quite obviously, this invention can be utilized with a wide range of instruments, including piano, harpsichord, and organ, and can include the illumination of either or both keyboards of the organ, and even include the bass pedals that may be involved. Fretted instruments can of course include guitar, banjo and ukulele.

In contrast with certain prior art arrangements, the practice of my invention entails the use of no additional keyboards requiring the presence of the instructor, and because the present sight and sound instruction amounts to such a highly effective technique, it is possible for the beginning musician to be playing recognizable melodies at a much faster rate when was ever previously possible. The instructional tapes can be played either by a tape player built into the keyboard instrument, or alternatively, by an ancillary piece of equipment. Quite obviously, the tape can be played over and over at the behest of the student until such time as he or she has mastered each portion of the melody.

In the typical instance, the tape is a magnetic tape played on an appropriate tape player, and although the tape can be a single channel tape containing both oral instruction as well as coded information to trigger the illumination means, I preferably use a multi-channel tape in which one of the channels contains voice instruction, and the other channel or channels contain the electronic data utilized for contemporaneously bringing about the illumination of certain selected keys or frets as a helpful supplement to the spoken instruction.

There are obviously a wide variety of ways in which my sight and sound instructional technique can be utilized in the home for instructing a student in the playing of a musical instrument. In the interests of providing an arrangement which is practical and economical and that can be afforded by the average home, I preferably utilize cassette type tapes, with the tape player either being separate or built into the musical instrument itself.

In order to extract the information prerecorded upon the tape and utilize it in the most straightforward manner for the selective illumination of the bulbs, I preferably utilize a binary sequential decoding system involving input logic, display decoder and memory, with latter being connected to suitable display and drivers. Preferably, the tape is prerecorded with data in the form of a 8 KHz sine wave containing sequential binary width modulated data. Two separate amplitudes are involved, with a smaller one being the carrier and the larger amplitude representing data to be interpreted and utilized by the aforementioned decoding system. Suitable means are utilized to extract synchronization type information contained on the tape, which information is employed to assure proper operation. In one exemplary arrangement, I divide each 1/10 of a second on the tape into 40 equal segments, with one of these being concerned with synchronization. Hence, I can easily control 39 display elements, such as may include illumination means under or adjacent two or so octaves of keys, or adjacent certain organ stops and even associated with the bass pedals in order that the student will be instructed in a most dynamic manner. Although the illumination means can be ordinary incandescent bulbs of small size, such means can also include light emitting diodes or the like.

As another facet of the invention, I can provide a selector switch arrangement that, upon being suitably manipulated by the student, can cause the actual striking of the strings in the case of a piano, or the actual operation of the tone generators of an organ, in response to certain data contained on the tape.

My invention significantly is not limited to use with keyboard and fretted instruments of normal size, for manifestly it can be employed with items of much larger size utilized for the purpose of group instruction.

Another facet of my invention involves the use of a rhythm player, which is a novel device sensitive to information on the tape, that functions to cause the main output to the loudspeakers utilized to open and close in a preascertained manner, thus providing a rhythm to the melody being played by the beginning musician that he would in most instances not have the skill to provide for himself.

It is the primary object of my invention to provide an audio and visual teaching aid for keyboard and fretted instruments which is economical enough to be afforded by virtually every home equipped with such instruments.

It is another object of my invention to provide such musical instruments with a novel tape unit such that both oral and visual instruction may be contemporaneously furnished to a beginning musician, utilizing only the original keyboards or frets inherent in the instrument design.

It is still another object of my invention to provide an illuminated keyboard or fret arrangement whose illumination means are selectively operated at a most economical manner in concert with oral instruction, with both the means for causing selective illumination and the oral instruction being contained on a single tape.

It is yet another object of my invention to provide a most effective arrangement by the use of which instruction may be provided for a keyboard and fretted instrument, with the beginning musician being reached by auditory and visual means coordinated in a highly effective and interesting manner.

Yet another object of my invention is to provide an arrangement in which the student can selectively cause keys to be struck or notes played automatically by the keyboard instrument, rather than merely the keyboard lights being turned on by the playing of a melody.

Yet still another object of my invention is to provide a high speed decoding system for instructing beginners in keyboard or fretted instruments in a most interesting and effective manner, with the speed of response of the decoding system being such that each bulb to be lit is caused to light without hesitation, in a virtually instantaneous manner. This high speed response makes it possible to switch rhythm and drum devices in desired rhythm patterns not possible with a slower system.

It is yet still another object of my invention to provide an instructional arrangement for certain musical instruments, contained on a prerecorded tape, with any variations in speed of the tape not being of consequence to the quality of the instruction.

These and other objects, features and advantages will become more apparent from a study of the appended drawings in which.

DETAILED DESCRIPTION

Figure 1:
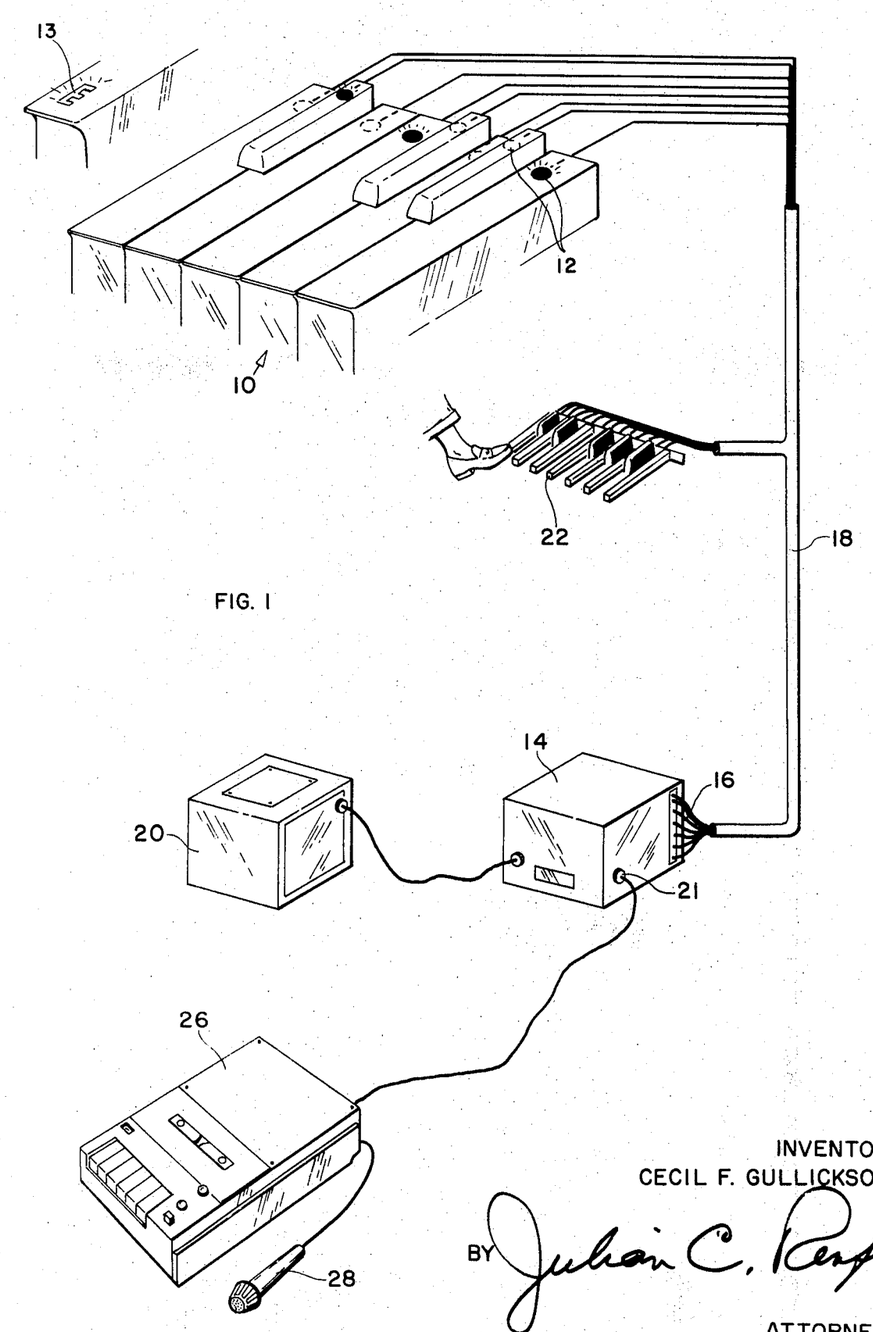
FIG. 1 is a schematic representation of the basic interrelationships between the illuminated keyboard of a musical instrument, the optionally illuminated bass pedals of such instrument, a decoder in accordance with this invention, and a tape player, representing the preferred type of input means for the decoder.

Turning to FIG. 1, it will be seen that in this exemplary embodiment of this invention, I have shown a portion of the keyboard 10 of a keyboard instrument upon which instruction is to be provided to a player, who may be a beginning musician. This instrument may of course be a piano, organ, or the like. The illustrated keyboard section represents a plurality of black and white keys, with each of these keys being equipped with an illumination source. For example, individual bulbs may be contained within the confines of the keys in approximately the positions indicated at 12, such that when illuminated, these bulbs clearly indicate to the student which key or group of keys is to be struck. The illumination means may be disposed below certain indicia, such as under the letter E as shown at 13 in the fragmentary view adjacent the keyboard portion 10. Wires are preferably used for carrying current from the decoding system to the illumination means.

Obviously, I am not to be limited to this arrangement, for the illumination means can be in the form of a light bar disposed above the upper rear portion of the keys, or for that matter any of a number of other individually operable illumination means can be utilized such that the keys to be struck by the student can be clearly indicated. Reference should be had to my patent entitled "Music Teaching Aid," U.S. Pat. No. 3,415,152, which issued Dec. 10. 1968 for additional pertinent details.

Most significantly, a multi-channel decoder 14 having a number of output terminals 16 is provided in FIG. 1, with the arrangement being such that each wire connected to each illumination means is also connected to a responsive terminal of the decoder, this being accomplished through an electrical cable 18. Thus, when the circuit associated with a given bulb or group of bulbs is caused to close in accordance with the operation of my invention, an electrical current is caused to flow to the selected bulbs. An appropriate power supply 20 connected to the multichannel decoder 14 is provided to supply the current that passes through the illuminating means.

Although a number of different decoders could be utilized, I prefer to use a decoder 14 utilizing a binary sequential decoding system that will be discussed in greater detail hereinafter, and it should now suffice to say that the multi-channel decoder 14 comprises input logic, display decoder and memory, with latter being connected to suitable display and drivers. Thus, upon the decoder receiving at its input 21, certain binary information from cassette tape player 26, it operates in a specific and predictable manner so as to bring about the illumination of specific ones of the illuminating means associated with the keys. It should be noted that the bass pedals 22 may contain illumination means, preferably mounted on the organ cabinet immediately above each pedal.

Although I could utilize a standard size player, I prefer to utilize a cassette type tape player, utilizing tapes containing oral instruction as well as musical tones. Obviously, I can use either a single channel tape player, or a multi-channel device, with the multi-channel device being preferred, providing means whereby the oral instruction can be in one channel and the coded frequencies or tones delivered to the decoder in a separate channel.

As shown now be apparent, the beginning musician can obtain a prerecorded instructional tape that will contain oral instruction that he can hear over the loudspeaker of the tape player, and by virtue of my invention, he or she can also see certain keys of the keyboard illuminated, thus specifically indicating which keys should be struck at a certain time in order to bring about the playing of a chord or melody forming a part of the taped instruction.

Figure 2:
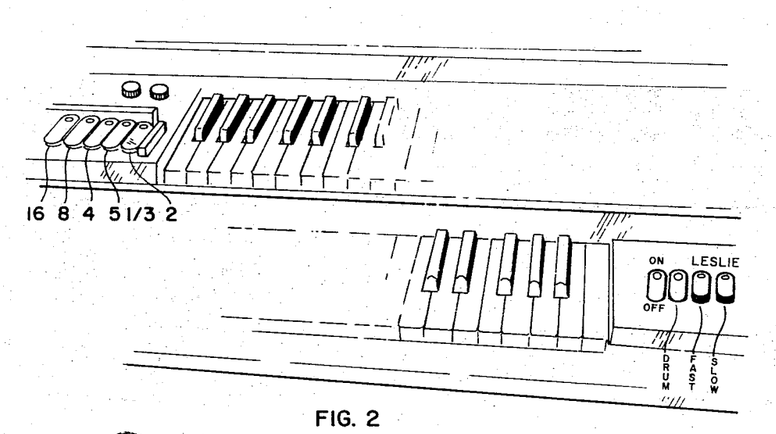
FIG. 2 is a representation of a portion of the keyboard of a two manual organ, with illumination means disposed at various locations thereon so that for example the stops to be actuated and the notes to be played can be indicated to the beginning musician.

Turning to FIG. 2 it will there be seen that I have shown a keyboard arrangement of a type utilized with a two manual organ, although if desired, a single manual organ could be adapted to utilize the teachings of this invention. Inasmuch as is afterward explained, the illustrating embodiment of my invention involves a decoding arrangement that separates each one tenth of a second into 40 equal segments, this makes 39 display elements associated with an organ or the like available to be selectively actuated after one segment has been used for synchronization purposes. For example, lights may be used in association with a keyboard, the organ control switches, and the bass pedals. One particular arrangement involved the use of 12 chord lights, 18 melody lights and nine switch lights. If a larger encoder arrangement is used, more lights can be available to be selectively illuminated. In FIG. 2 it will be seen that I have provided bulbs in several selected locations, including keys, stops, and certain switches, but I am not of course to be limited to the illustrated arrangement.

Figure 3:
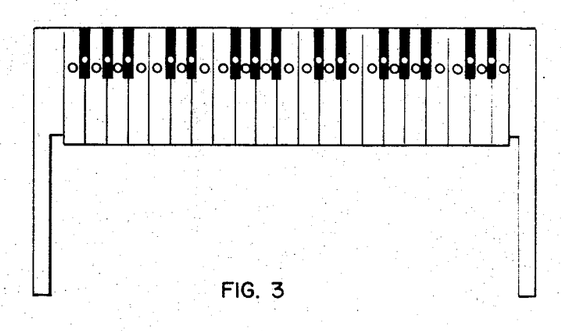
FIG. 3 is a representation of a large instructional keyboard equipped with selectively illuminated bulbs or the like in or adjacent the keys of the keyboard, thus making this device well suited for classroom instruction.

Turning to FIG. 3, it will there be seen that I have provided a large display type keyboard suitable for classroom instruction, and in this instance I can, for example, arrange for each of the 36 keys depicted to be selectively lighted in a manner that will be more fully described hereinafter.

Figure 4:
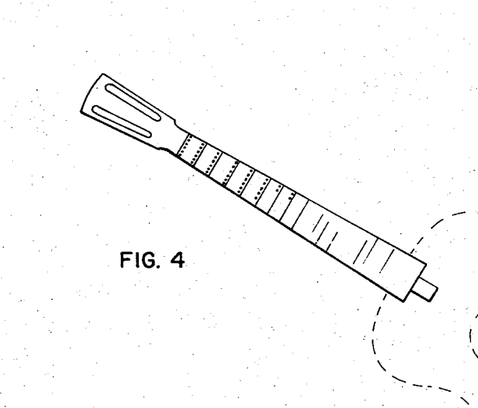
FIG. 4 is a showing of a fret board of a stringed instrument with selectively illuminated bulb means being utilized thereon for the instruction of beginning musicians.
Figure 5:
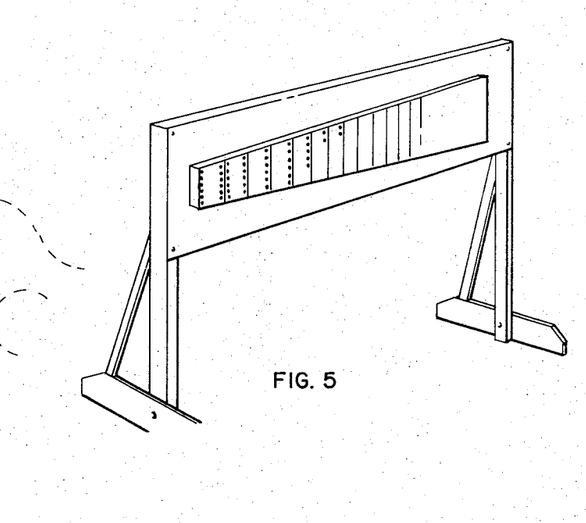
FIG. 5 is a representation of a large fret board provided with selectively illuminated bulbs suitable for classroom instruction.

FIG. 4 makes it apparent that my invention can be used on the necks of fretted instruments, involving for example the use of a large number of bulbs at selected locations adjacent the frets that would be fingered by a student learning to play a guitar, ukulele, banjo and the like. FIG. 5 illustrates on a large instructional type board, how the frets may be selectively illuminated for classroom instruction purposes.

It will also be obvious that the display boards shown in FIGS. 3 and 5 can be used in conjunction with arrangements provided for the entertainment of groups or audiences.

Figure 6:
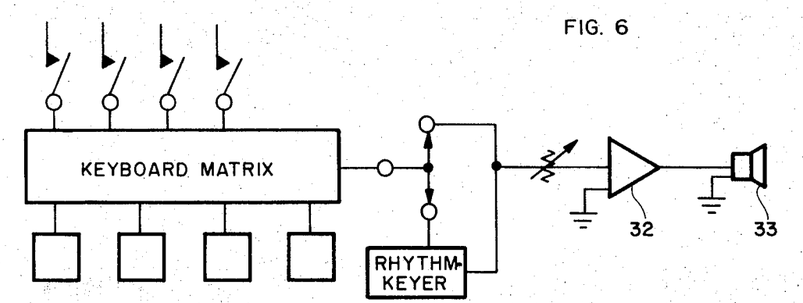
FIG. 6 is a block diagram of a rhythm keyer arrangement in accordance with this invention.

Turning to FIG. 6 it will there be seen that I have depicted an optional rhythm keyer device that may be utilized in accordance with my invention to provide rhythm to the musical selections being played, thus to accomplish the provision of rhythms to the music of a beginning musician, involving a skill level not otherwise available to such musician. A Keyboard Matrix is represented in this figure, below which are symbolically represented a number of keys, and above which are the associated switches operated by such keys. The output of the Keyboard Matrix is to a Rhythm Keyer, which is typically placed in the common lead of the bass pedals and/or the lower keyboard of an organ, with the function of this device being to interrupt the tones of the chords and/or the bass being played in accordance with predetermined rhythm patterns that were placed as data on the tape. The output from the Rhythm Keyer is of course connected to an amplifier 32 and thence to a speaker 33.

Figure 7:
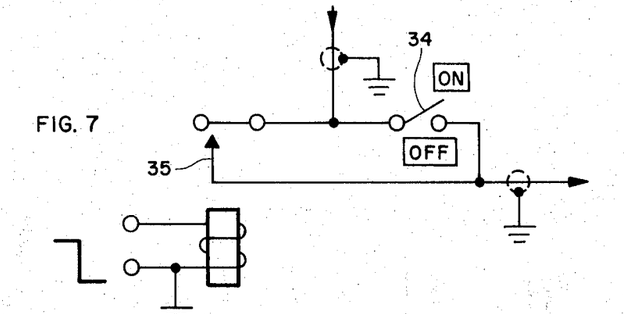
FIG. 7 is a view to a larger scale of the principal portion of the rhythm keyer.

FIG. 7 reveals in greater detail the important portions of the rhythm keyer, and when the switch 34 is in the "on" position illustrated, the rhythm keyer will be operated when signals from the tape are processed by the decoder and directed to the terminals of the winding of relay 35. The relay 35 may be arranged to close upon receiving a suitable signal from the decoder, and automatically open at the instant the signal is removed, causing signals coming from the keyboard to flow to the amplifier 32 and speaker system 33 for the duration of the time the relay is closed. In other words, information on the tape closes and opens the relay in response to a pre-recorded pattern and in a manner serve to cause the musical tones reaching the speaker 33 to be modulated with a suitable rhythm. Musical tones reach the amplifier and speaker uninterruptedly when the switch 34 is turned off.

Figure 8:
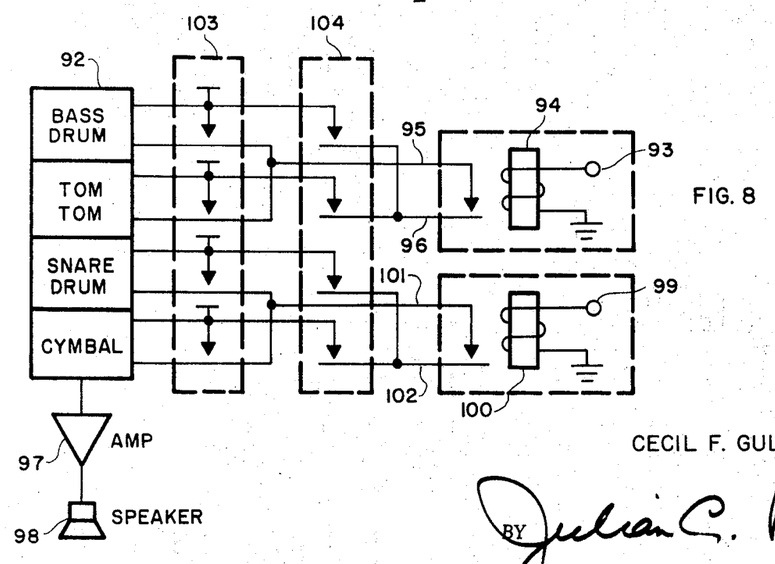
FIG. 8 is a representation of a drum rhythm keyer that may be used in accordance with my invention.

In a somewhat similar manner, pre-recorded information on the tape can serve to close and open two similar relays for the purposes of rhythmically keying percussion sounds emanating from an electronic drum device 92 contained within an electric organ for example. Electronic drum and trap audio generator devices are of course currently available, which provide electronically simulated sounds suitable for use with organs and the like. As depicted in FIG. 8, these sounds usually include a bass drum, wood block tom-tom, snare drum, and cymbal. A push button 103 may in accordance with conventional design be used to manually key the individual sounds, and in keeping with the teachings of this invention, a selector switch 104 may be provided such that the desired sound or sounds may be obtained in accordance with the tape being played.

When a signal from the decoder is received by terminal 93, relay 94 closes the circuit between leads 95 and 96, causing any preselected drum sounds (bass drum or tom-tom) to be keyed, thence routed to the audio-amplifier 97 and finally to the speaker 98.

Likewise, a signal from the decoder arriving at terminal 99 will activate relay 100, thereby closing circuit 101, 102, and keying snare drum and/or cymbal. The selector switch arrangement 104 represents a construction whereby the operator at his or her election may selectively cause the bass drum and/or the tom-tom to be connected to lead 96, and similarly, may cause the snare drum and/or the cymbal to be connected to lead 102. It can therefore be seen that pre-recorded data emanating from the tape player can cause the decoder to put out a signal to leads 93 and/or 99, thereby causing a pre-recorded drum rhythm pattern to be automatically played, without it being necessary for the operator to operate manual switches 103.

Drum rhythm patterns usually consist of a down beat and an up beat effect. As an example a simple foxtrot rhythm pattern requires one down beat followed by one up beat, thusly 1↓, 2↑, 1↓, 2↑, etc.

The bass drum is then played on the 1 or down beat with snare drum and/or cymbal most often used exclusively on the up, or 2 beat. It is because of this fact that I find it desirable to use the selector switch arrangement shown in FIG. 8 in my drum rhythm playing device, so that one part of the percussion device can function to key the down beat effects, and the other part function to key the up beat effects.

Figures 9, 10:
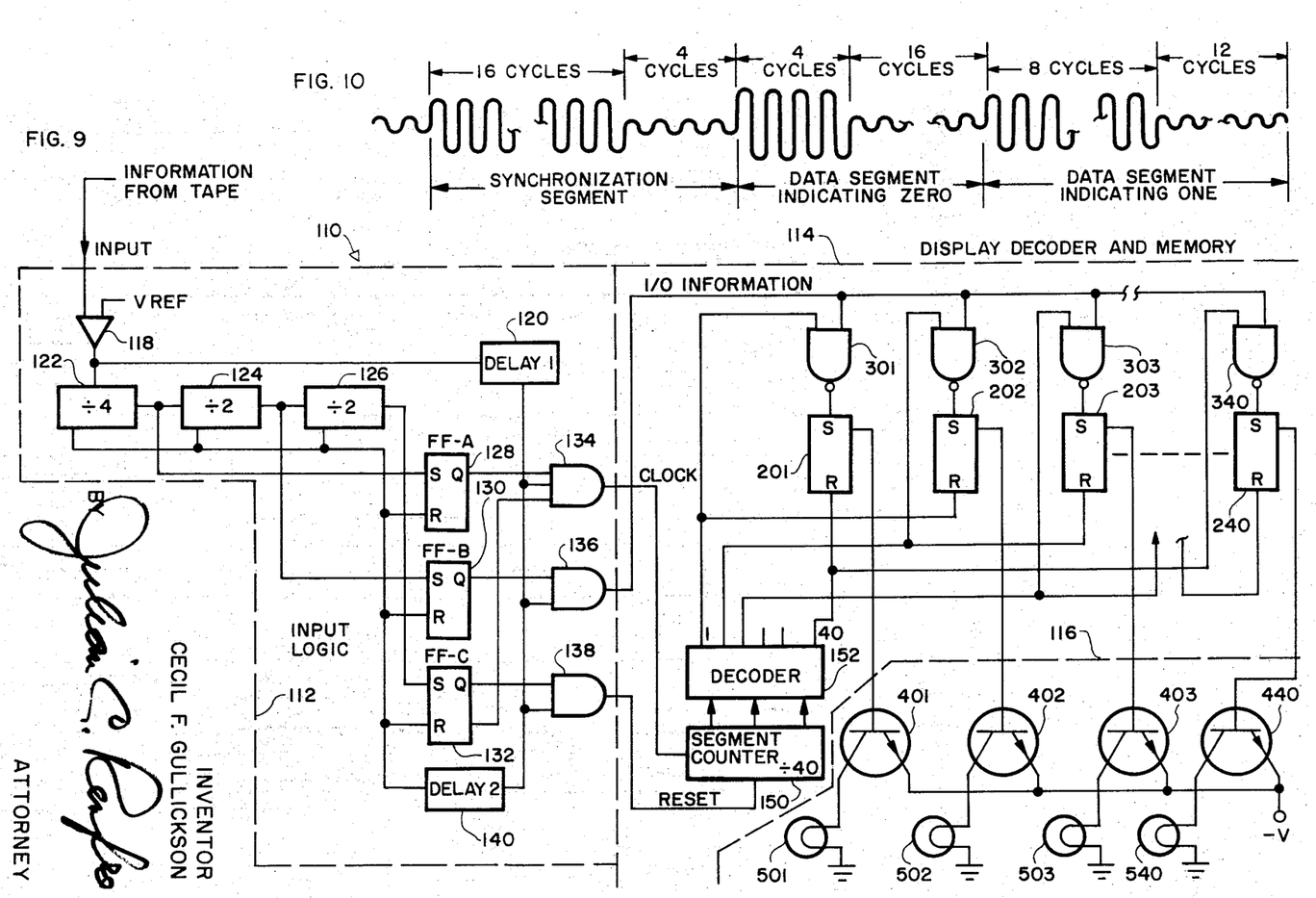
FIG. 9 is a view of the display decoder and memory arrangement utilized in accordance with this invention.
FIG. 10 is a view of the waveform provided by a prerecorded tape to the decoder of FIG. 9, with the various intelligence-containing portions of the waveform being called out.

Turning now to FIG. 9 wherein I show a block diagram relating to the decoder utilized with my invention, it will be noted that I have indicated at 110 a binary sequential decoding system utilizing input logic 112, and a display decoder and memory 114, with the latter being connected to the display and drivers 116.

The previously discussed tape player is arranged to play a tape upon which pre-recorded digital information has been placed. The input formation from the tape is amplified and processed so that a set of square wave signals is obtained when the signal therefrom is in the high amplitude condition. Data and sync signals are each provided by the tape. The comparator 118 of the input logic 112 is utilized to square signals when they appear above a designated amplitude, so that the remainder of the processing may be accomplished digitally.

As will be seen hereinafter, this portion of my invention separates each 1/10th of a second into 40 equal segments, facilitating the control of 39 display elements to be utilized with an electronic organ or other such instrument. A segment is used for synchronization to verify each time a frame begins. The occurance of frame sync may also be displayed to indicate that the system is functioning.

With regard to the input information put on the tape during the encoding procedure, the data input is in the form of an 8 KHz sine wave containing sequential binary width modulated data. As will be seen in FIG. 10, the recorded sine wave has two separable amplitudes, with the smaller being the carrier and the larger amplitude being the data. The first segment, which represents sync, has a duration of 16 cycles. With one of the 40 segments being used for sync, this leaves 39 segments for information. FIG. 10 makes clear a number of the relationships utilized herein.

Frame sync has a high amplitude for 2 ms, leaving 4 cycles of 8 KHz at the low amplitude before the next word. Each segment has a duration of 2.5 ms as derived from 20 cycles of the carrier. Each segment contains 4 or 8 cycles of high amplitude information in order to maintain a clock on the decoder.

With regard to the output of the comparator 118, a square wave is delivered to a Delay 120 and to a Divide-by Four device 122 if the sine wave is above a certain threshold (normal carrier level). The first pulse of every segment out of comparator 118 will drive the Delay circuit 120 and cause it to generate a single pulse after 2.25 milliseconds.

It is possible that my invention will be used in conjunction with a variable speed tape recorder, and in that instance, it is desirable for the delay 120 to be a counter whose input is keyed to the tape speed, such that the time delay output will always sample the data at the correct or desired time, independent of tape speed. This arrangement facilitates the user operating the equipment at a low speed when initially learning a new sequence, and as his or her proficiency increases, the tape speed may be increased accordingly, without readjustment of the processor or decoder. Such counter may be a so-called preset counter so that a prescribed number of cycles will bring about an output.

Data is derived from the width modulated information by noting the number of cycles above the threshold level, and to this end I provide the Divide-by Four device 122, and two Divide-by Two devices 124 and 126 in order to detect the width of the data in each segment.

The Divide-by Four device 122 provides a pulse out when 4 pulses have been applied, and this device 122 may of course be a dual flip-flop, having the designation MC853P. Thus, when the number of pulses detected reach four, the output of device 122 will set flip-flop 128 (flip-flop A).

Similarly, when eight pulses have been detected, the device 124 will cause the flip-flop 130 (flip-flop B) to be set, and this is to be interpreted to mean that the width of the pulse is sufficient to be considered as a segment indicating a ONE. If the pulse has sufficient width to be sync pulse, 8 more pulses will be detected, causing the Divide-by Two device 126 to set flip-flop 132 (flip-flop C).

Assuming at this point that all three flip-flops A, B and C are in the set position, this is the longest data period involved and constitutes frame sync. Since this is 2 milliseconds long, and the delay period is 2.25 milliseconds long, the delay will sample gates 134, 136 and 138 during the off period in all cases.

The frame sync signal is used to reset the segment counter 150 to synchronize the decoder outputs with the information on the tape.

0.25 milliseconds prior to the beginning of any segment, the information in flip-flops A, B and C (128, 130 and 132) is used to drive the display decoder and memory. A pulse from the Delay device 120 enables gates 134, 136 and 138 to generate the clock, 1/0 information, and reset, respectively. Gate 134 being connected to the output of flip-flop 128 causes an output to be given at the end of each data segment except the output is inhibited during the synchronization segment which furnishes the reset pulse.

As will be apparent, gate 136 is connected to flip-flop 130 and generates an output if device 130 is set, and gate 138 generates an output if flip-flop 132 is set. It should be noted that a connection is provided such that the clock output of gate 134 is inhibited if flip-flop 132 is set.

After the data for the past segment has been translated into 1/0 data and clock, or reset, the output of Delay 120 is further delayed by Delay 140 to provide enough time for gates 134, 136 and 138 to react before resetting all flip-flops in the input logic 110.

It will be noted from the drawing that the clock output from gate 134 and the reset output from gate 138 are connected to the Divide by 40 counter 150 which serves as a segment counter, with the output from latter device being set to the decoder 152. It will be noted that the segment counter and decoder arrangement contains gates and flip-flops to distribute data to the appropriate display device. The decoder serves to decode the Divide-by 40 output into 40 equal time segments, with each bit representing a data segment.

It should now be apparent that when flip-flop 132 is set, the output of gate 138 resets the Divide-by 40 counter to count No. 1, which is designated as the frame sync interval.

As indicated in FIG. 9, 40 wires emanate from the decoder 152, with each wiring going positive during its designated time slot.

It is important to note that when flip-flop 130 is in the set position, the output of gate 136 serves to drive gates 301, 302, 303 . . . 340, with these gates being enabled sequentially by the output of decoder 152.

If an output occurs on one of the gates 301, 302, 303, etc., the associated flip-flop 201, 202, 203, etc. will be set. The output of the decoder 152 is so wired to the flip-flops as to reset them during the segment preceding the period where it may be set.

The number one output of the decoder 152 will therefore enable gate 301 and reset flip-flop 202.

The flip-flops 201 through 240 drive transistors 401, 402, 403 . . . 440 respectively, which in turn are connected to display elements 501, 502, 503 . . . 540. These display elements may of course be deployed in or adjacent the keys of the organ, the stop tabs, the bass pedals, or on other musical instruments such as the frets of a stringed instrument.

As will now be apparent, at the beginning of each data segment, either 4 or 8 cycles of 8 KHz data will be received, depending upon whether the associated key was pressed during the encoding procedure, with it of course also being apparent that the display device, such as a bulb or light-emitting diode (LED) associated with a given key, stop or pedal may remain on throughout a number of cycles of operation of the aforementioned device, depending of course upon the length of time the associated key was depressed during the time the tape was being recorded.

Figure 11:
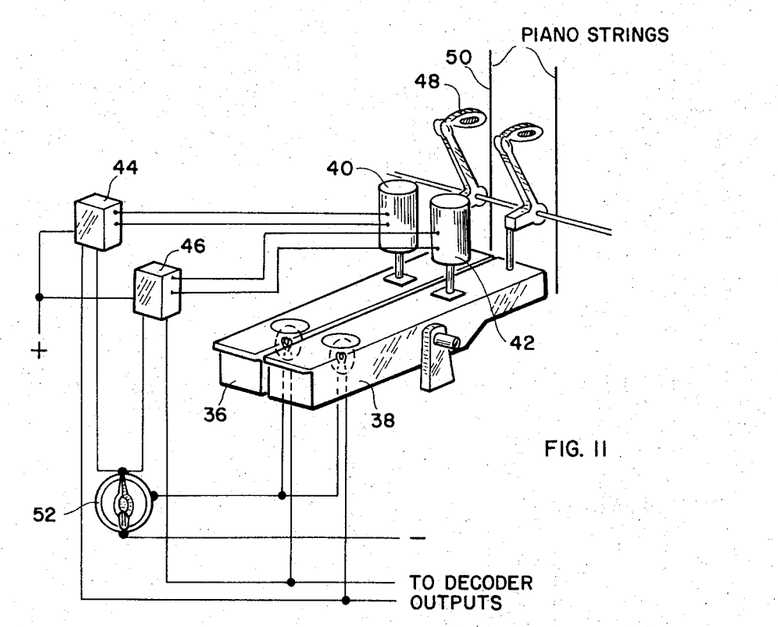
FIG. 11 is a schematic representation of an arrangement by which decoder inputs to the keys of a piano can be utilized for causing the strings of a piano to be struck by their respective hammers in accordance with information contained on the tape.

Turning now to FIG. 11, I have there illustrated an exemplary embodiment of an arrangement by the use of which the melody being played by a tape player for example, may bring about the actual striking of the keys of a piano.

In this embodiment, I utilize piano keys 36 and 38 that are fulcrumed at approximately their mid-point in such a way that movement of these keys causes a hammer to strike an adjacent piano string, irrespective of whether the front or forward portion of the key is pushed down, or the rear portion of the key is pulled up. Upward movement of the rear portion of either of these keys in other words causes a movement of the respective hammer to and against the respective string, thus of course enabling the piano to be played in a conventional manner. However, this embodiment also utilizes solenoids 40 and 42 in association with these keys, and, if necessary, may optionally use relays 44 and 46 associated with these solenoids. Thus, upon closing of the relay 44, for example, the solenoid 40 connected to that relay is caused to be actuated, and upon being actuated, causes the rear portion of the key to be raised, thus bringing about a striking of the piano string 50 by hammer 48 in the manner previously described. Obviously, the two relays 44 and 46 shown in this figure can be of a conventional type, that are arranged to direct a comparatively heavy current through the piano key solenoids 40 and 42 upon a comparatively small current being received from another source, preferably the decoder 14. In many instances, the relays 44 and 46 are not required. A switch 52 enables the user to select between the automatic playing of the keys through solenoid means, and the manual operation of the keys in response to the illumination thereof.

In the preferred instance, the current bringing about a closing of relays 44 and 46 is supplied from the decoder of FIG. 9, which of course derives its outputs from a pre-recorded tape. Thus, in addition to the bringing about of the selected illumination of the keys in accordance with the embodiment described in FIG. 1, I can simultaneously cause the actual notes to be struck and played. In this manner, a tape recorded song can be caused to be played in much the manner of a player piano with much less expense than is usually associated with such a function.

Figure 12:
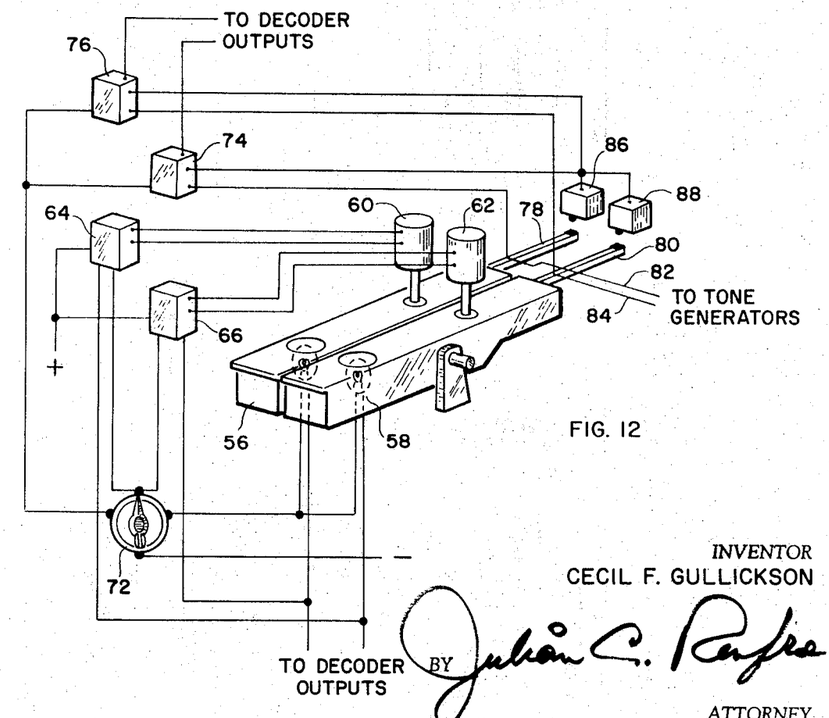
FIG. 12 is a schematic representation of an arrangement by which decoder inputs to the keys of an organ can be utilized for causing the tone generators of the organ to be actuated by certain portions of the tape.

Turning to FIG. 12, I have there shown two typical keys, 56 and 58, of an organ keyboard, in conjunction with a relay and solenoid system somewhat similar to that of FIG. 11. In this instance, solenoids 60 and 62 are utilized for an automatic playing of these keys in response to signals from the respective decoder. More particularly, upon relays 64 and 66 being caused to close as a result of the respective decoder responding to certain tape-supplied data, the solenoids 60 and 62 are caused to actuate, and lift the rear portion of the keys. I can use the solenoids to move the keys of the organ thus closing the switches, or alternatively, in certain organs where a system allows, I can use a relay similar to the ordinary relays of FIG. 11 to do the actual closing of the switches of the organ keys, thereby bringing about the playing of the melody.

This action of the keys results in the organ keying switches 78 or 80 being moved into contact with the contacts 86 and 88, thus completing through respective leads 82 and 84, the circuits through respective organ tone generators (not shown).

Movement of the switch 72 counterclockwise to what may be regarded as the 9 o'clock position energizes relays 74 and 76 to a state of readiness to receive signals from the decoder. As an example, if relay 74 receives an output signal from the decoder, this will cause a circuit to be closed corresponding to contact 78 closing with contact 86, and resulting in the equivalent tone generator response as would have resulted from a mechanical movement of the key.

Movement of the switch to the 3 o'clock position will place the key illumination means in the circuit with the decoder outputs to bring about the selective illumination of the keys for the purpose of manual playing, without any of these automatic features being involved.

As will now be apparent to those skilled in the art, I have provided a means for effectively teaching the playing of a keyboard instrument, utilizing selectively operated illumination means in or adjacent the keys of the keyboard, with the arrangement being such that by suitably pressing or striking the indicated keys, the player can cause certain notes to be sounded. These notes can include individual tones as well as chords composed of several tones. By simultaneously pressing for example three or four keys of a musical chord in response to the lighting of the respective illumination means, the chord will be played during the time the keys are depressed. The manner in which the bass pedals of an organ are to be played can also be indicated by lights.

Due to the flexibility and speed of the binary sequential decoding system taught herein, which of course receives intelligence from a pre-recorded tape, I am able to provide many pleasing and educational capabilities to any ordinary electronic organ. Tapes can be selected such that the beginning musician can gradually move from the simple melodies, to playing complicated numbers involving the use of both hands as well as the feet.

Furthermore, by selectively switching a rhythm switch provided in accordance with this invention, the above mentioned chords can be caused to be played in a rhythmic fashion, and in addition, electronically simulated percussion sounds can be automatically and appropriately interposed, in response to data placed upon the tape.

Data may be placed on tapes such that illumination means can be caused to light individually, or in groups of any practical number, thus making it possible for the player, by following the illuminated incandescent or neon bulbs, or light emitting diodes, to play a melody with which suitable chords are properly interposed. The potential of my novel binary sequential decoding system is such that any practical number of functions can be simultaneously activated without exceeding the capability of my device. Such functions can of course include in addition to the lighting of the melody keys with the appropriate chords, the illumination of the stop tabs and switches to be manipulated by the organist. Further, the operation of bass pedals coupled with the automatic provision of rhythm and percussion amounts to an arrangement designed to give pleasure and delight to almost any member of the family.

I claim:

1. A sight and sound instructional device for a musical instrument, comprising a plurality of illumination means associated with the portions of the instrument to be contacted by the fingers of the player, control means comprising input logic, and display decoder and memory circuits for selectively causing the illumination of said illumination means for the instruction of the player, and a tape playing device arranged to play a pre-recorded tape containing coded information bringing about the operation of said control means, thus to bring about selective illumination of said illumination means, said musical instrument being provided with a loudspeaker from which musical tones can emanate during the playing of the instrument, and rhythm providing means for selectively interrupting the tones so as to provide a pre-recorded rhythm to the music from the information contained on the tape.

2. The device as defined in claim 1 in which means associated with said control means are connected to said rhythm providing means such that data pre-recorded on the tape directly brings about the operation of said rhythm providing means.

3. A sight and sound instructional device for a musical instrument, comprising a plurality of illumination means associated with the portions of the instrument to be contacted by the fingers of the player, control means comprising input logic, and display decoder and memory circuits for selectively causing the illumination of said illumination means for the instruction of the player, and a tape playing device arranged to play a pre-recorded tape containing coded information bringing about the operation of said control means, thus to bring about selective illumination of said illumination means, said musical instrument utilizing a device containing electronic simulations of percussion sounds, selector switch means on latter device for enabling one or more selected sounds to be utilized in conjunction with music being played on the instrument, and means from said decoder connected to said latter device such that digital information pre-recorded on the tape brings about the rhythmic interposing of selected percussion sounds.

4. A sight and sound instructional arrangement for use in conjunction with a musical instrument having a keyboard, comprising illumination means associated with certain keys of the musical instrument, a decoder containing digital components, which generates signals to activate the illumination means of selected keys, said decoder having input means derived from pre-recorded digital information, and in response thereto, causes selected ones of said illumination means to be illuminated each time its respective address is sensed, a tape player connected to said decoder input, said decoder utilizing a counter whose input is keyed to the speed of the tape, such that the time delay output will always sample the data supplied by the tape at the correct time, independently of tape speed.

5. An instructional device for a musical instrument, comprising a plurality of illumination means contained within the portions of the instrument to be contacted by the fingers of the player, a tape playing device arranged for playing a pre-recorded tape containing coded instructional information, control means operatively connected to said plurality of illumination means, and decoder means responsive to such coded instructional information, said decoder means operatively connected to said control means thereby selectively causing the illumination of said plurality of illumination means singly and in various combinations and sequences for instruction of the player as determined by such instructional information, said control means including means selectively operative at variable speeds lower than as well as normal speed for the musical selections being taught, said pre-recorded tape containing audio instructional information on a recording track separate from recording track carrying said coded instructional information.

6. An instructional arrangement for use in conjunction with a musical instrument having a keyboard, comprising illumination means disposed within certain keys of the musical instrument, and a decoder responsive to amplitude and width modulated segments of a sinusoidal carrier wave, said decoder having input means such that said decoder responds to pre-recorded information supplied thereto, where such pre-recorded information is amplitude and width modulated segments of the sinusoidal carrier wave, said decoder being operatively connected to said illumination means for causing respective ones of said illumination means to be illuminated for a selected period each time its respective address is sensed.

7. The sight and sound teaching aid as defined in claim 6 in which means are provided to cause the instrument to be played automatically in response to data delivered to the decoder input.

8. An instructional arrangement for use in conjunction with a musical instrument having a keyboard, comprising illumination means disposed within certain keys of the musical instrument, a decoder responsive to amplitude and width modulated segments of a sinusoidal carrier wave, which generates control signals for activating the illumination means of selected keys, said decoder having input means derived from pre-recorded coded digital information, and in response thereto, causing selected ones of said illumination means to be illuminated for a selected period each time its respective coded address is sensed.

9. The instructional arrangement as defined in claim 8 in which a tape player is connected to said decoder input.

10. The instructional arrangement as defined in claim 8 in which means are utilized for causing the keyboard instrument to produce notes automatically in response to certain inputs to the decoder.

11. The device as defined in claim 8 in which said decoder comprises logic circuits responsive to said amplitude and width modulated segments of said carrier, effectively causing illumination of all of said selected notes during said sequence for which said amplitude and width modulation pattern in the corresponding segments is indicative of an ON condition.

12. The device defined in claim 8 in which said decoder comprises logic circuits responsive to the modulation pattern indicative of the start of a sequence in the first segment of the sequence, and to the modulation patterns indicative respectively of the ON and OFF conditions in the remaining segments of the sequence, said logic circuit sequentially causing illumination of all notes having their associated segments in the ON condition and sequentially causing the illumination to be extinguished for all notes illuminated during the previous sequence and for which their associated segments are in the OFF condition.

13. The device as defined in claim 12 in which said logic circuits utilize a counter whose input is keyed to the speed of the tape, such that the time delay output will always sample the information supplied by the tape at the correct time, indepndnetly of tape speed thereby providing variable speed operation.

14. An instructional device for a musical instrument, comprising a plurality of illumination means contained within the portions of the instrument to be contacted by the fingers of the player, a tape playing device arranged for playing a pre-recorded tape containing coded instructional information, control means operatively connected to said plurality of illumination means, and decoder means responsive to such coded instructional information, said decoder means operatively connected to said control means thereby selectively causing the illumination of said plurality of illumination means singly and in various combinations and sequences for instruction of the player as determined by such instructional information, said control means including means selectively operative at variable speeds lower than as well as normal speed for the musical selections being taught, said coded instructional information being in the form of a sequence comprising amplitude and width modulated segments of an audio frequency carrier, in which one segment of said sequence is amplitude and width modulated to indicate the start of a sequence, the remaining segments of said sequence each representative of one selected note of said musical instrument, and each of said remaining segments is amplitude and width modulated in a pattern to represent an ON condition and in a different pattern to represent an OFF condition.

15. An instructional device for a musical instrument that includes a device containing electronic simulations of percussion sounds, comprising a tape playing device arranged to play a pre-recorded tape containing coded information, decoder means responsive to such coded information, means connecting said electronic simulation device to said decoder means such that coded information pre-recorded on the tape brings about the rhythmic playing of said percussion sounds.

16. A sight and sound teaching device for a keyboard musical instrument in which each of a number of selected keys of the instrument has its respective illumination means, latter means being contained within the confines of said keys, a magnetic tape player associated with and connected to the instrument and adapted to contain a magnetic tape upon which audio information as well as coded information for visual instruction have been recorded on separate magnetic tracks, wherein such coded information is recorded as a sequence of amplitude and width modulated segments of a sinusoidal carrier wave, with the number of segments being greater than the number of said selected keys, such sequence of segments representing an information frame with at least one segment in such frame representing a synchronization signal and with each of said selected keys being associated with a respective segment in such frame, decoding means connected to receive the output of the coded information on said tape for decoding of same and controlling said illumination means, said decoding means including synchronization means for establishing the start of frame of such amplitude and width modulated segments, said synchronization means being responsive to a first selected number of high amplitude cycles of the sinusoidal carrier wave and to a first selected number of low amplitude cycles of the sinusoidal carrier wave occurring during the initial segment of such frame, switching means responsive to a second selected number of such high amplitude cycles and such low amplitude cycles during each of the successive segments in such frame, such selected numbers being indicative of a ONE condition, with each respective illumination means being illuminated when such ONE condition exists, and maintained illuminated until turned off, said switching means also being responsive to a third selected number of such high amplitude cycles and such low amplitude cycles during each of the successive segments in such frame, such selected third numbers being indicative of a ZERO condition, with each of said illumination means associated with its respective segment being extinguished if in an ON condition, and being maintained in an OFF condition if not already illuminated, whereby the prerecorded coded information is able to effectively control the duration of the illumination of the selected keys, and to establish a desirable tempo to be maintained.

* * * * *